C. F. HOVER.
SICKLE BAR.
APPLICATION FILED APR. 23, 1917.
1,240,720.
Patented Sept. 18, 1917.
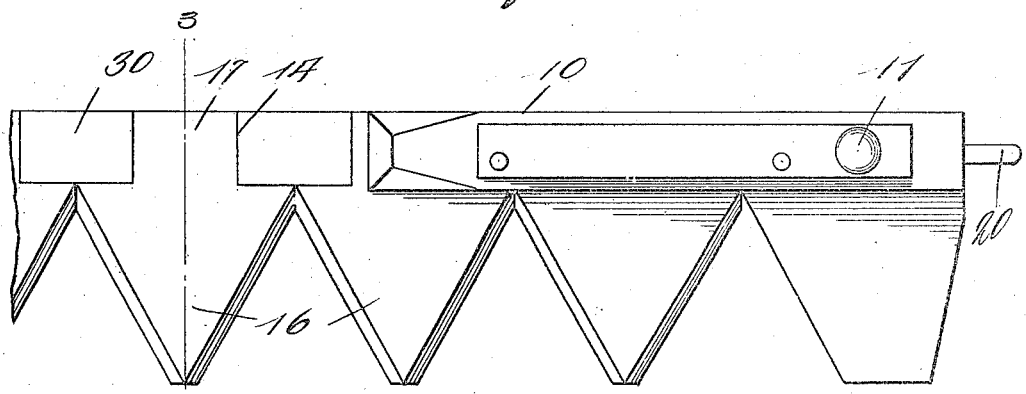
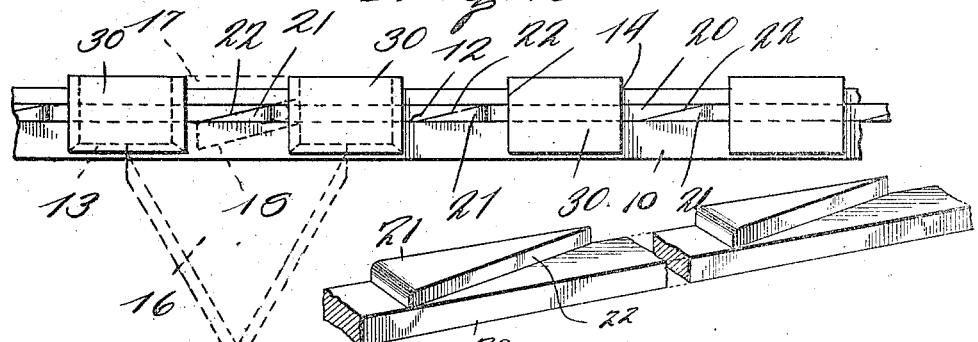
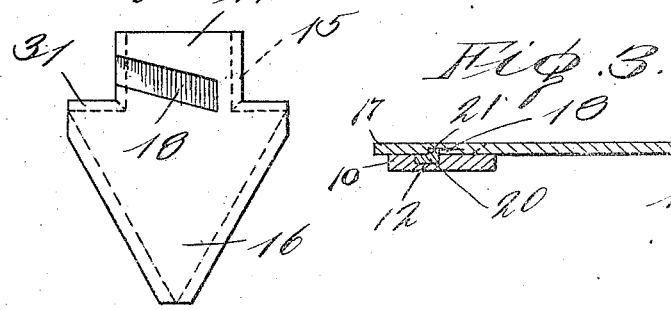
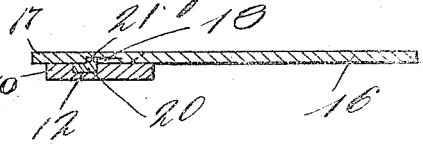
Witnesses
B. E. Brann
P. H. Pattison
Inventor
C. F. Hover
By 
Attorneys

UNITED STATES PATENT OFFICE.

CHARLES F. HOVER, OF CONRAD, MONTANA.

SICKLE-BAR.

1,240,720.   Specification of Letters Patent.   Patented Sept. 18, 1917.

Application filed April 23, 1917. Serial No. 163,924.

*To all whom it may concern:*

Be it known that I, CHARLES F. HOVER, a citizen of the United States, residing at Conrad, in the county of Teton, State of Montana, have invented certain new and useful Improvements in Sickle-Bars; and I do hereby declare the following to be a full, clear, and exact description of the invention, such as will enable others skilled in the art to which it appertains to make and use the same.

This invention relates to sickles such as are employed in connection with farm implements of various kinds and more particularly to a sickle bar in which the individual knives may be removed from the bar proper for sharpening or replacement. The object of the invention is to provide such a particular construction and arrangement of the various parts as will securely hold the cutting edges of the knives against displacement with respect to each other by holding the knives with utmost rigidity to the sickle bar so that in use the various parts will have the same fixed relation as if the bar and the knives were formed integral.

Referring to the drawings:

Figure 1 is a top plan view of a sickle bar constructed in accordance with the present invention.

Fig. 2 is a similar view showing the cutting elements removed.

Fig. 3 is a transverse sectional view on the line 3—3 of Fig. 1, and

Fig. 4 is a rear view of one of the cutting elements.

Fig. 5 is a detail perspective view of a portion of the locking rod.

Referring to the drawings, there is shown a sickle bar 10 having at one end a member 11 for connection of the usual pitman through the medium of which the bar is reciprocated upon the usual finger bar.

The bar 10 is provided with a longitudinal passage 12, extending throughout the length of the bar and with transverse slots 14 in its upper face extending from front to back of the bar and intersecting the passage 12 so that the slots and passage, intercommunicate through the top of the latter.

The slots 14 result in the formation of blocks or projections 30 upon the upper face of the bar that serve to space the slots and these blocks project beyond the rear face of the base of the bar 10 and terminate slightly short of its front face as illustrated in Fig. 2. The passage 12 extends upwardly into the lower portions of the blocks.

The front and side faces of each of the blocks or projections 30 are beveled downwardly and inwardly by undercutting, for a purpose to be presently explained.

In connection with the bar 10, there is employed a plurality of knives each including a substantially triangular body portion 16 having its forwardly convergent edges beveled to form cutting edges as is usual. Rearwardly from the base of each triangular knife there is an extension or stem 17 somewhat narrower than the length of the base of the knife body, each of these stems being of such dimensions as to snugly slide between a corresponding pair of blocks or projections 30, the longitudinal edges of each stem being beveled to correspond to the beveled side faces of the blocks between which the stem engages. These bevels of the stem are indicated at 15 and the beveling at each side of the stem is continued along the laterally projecting portions of the base of the body 16 of the knife, as shown at 31 so that when the knife is slid into the position indicated in dotted lines in Fig. 2 of the drawings, not only will there be a tight fit of the stem 17 between the blocks 30 but the bevels 31 will fit into the bevels of the corresponding portions of the front faces of the blocks 30, as will be understood. This fit is made accurate so that there can be no lateral movement of a stem between blocks while the engagement of the bevels 31 with the front bevels of the blocks serves to prevent springing of the corresponding portions of a knife upwardly and away from the base of the bar 10. It will be further noted that the base of the bar 10 extends forwardly and out under the knife part-way of the bevel of its cutting edge so that the blade is further braced. It will also be noted that the rear end of each stem 17 terminates flush with the rear faces of the blocks or projections 30 so that with them it overhangs the face of the bar 10, for a purpose to be presently explained.

In order to draw the knives firmly into their seats with the bevels 31 in positive contact to provide against any possibility of loosening and consequent springing of the cutting edge of one knife vertically with respect to the cutting edge of the next knife such as would permit of lodgment of stalks between the knives at the bases of their cutting edges, there is employed a rod 20 which is cross-sectionally angular to correspond to the passage 12 and this rod is provided upon its upper face with a plurality of lugs 21 corresponding in number to the slots 14. The lugs range longitudinally of the rod 20 with their front faces flush with the corresponding face of the rod and their rear faces extending diagonally from the front face to the rear face of the rod, the angle of each lug being equal to the angle of the parallel side walls of the groove 18 formed in the lower face of the stem 17 of each knife.

The lugs 21 rise above the bottoms of the slots 14 and when the rod 20 is moved longitudinally in one direction, these lugs take each into a groove 18 and by engagement of their diagonal faces 22 with the rear walls of the grooves 18, they serve to draw the knives firmly and hold them securely into intimate union with the corresponding portions of the bar. As previously stated, the blocks or projections 30 overhang the rear face of the body 10 of the bar as do also the rear ends of the stems 17 of the knives as illustrated in Fig. 3 of the drawing and these overhanging portions are designed to rest and slide upon the corresponding portion of the face of the usual finger bar in connection with which the sickle is employed, it being of course understood that the finger bar is stepped to correspond with this step formation of the sickle.

What is claimed is:

1. In a sickle, the combination with a bar having a longitudinal passage therethrough and a plurality of transverse slots in its upper face with resultant spaced blocks, the front and side walls of which are slantingly undercut with resultant bevels of a plurality of knives each having a transversely reduced stem projecting from its base and slidably fitted between a corresponding pair of blocks and into the side bevels of the latter and having its base at both sides of the stem beveled and fitted to the bevels of the front faces of the blocks, the stem of each knife having a diagonal groove in its under face and a rod slidably mounted in the passage of the bar and having lugs movable with the bar into and out of the grooves of the knife stems, each lug having a rear face diagonally disposed to engage the rear face of the groove of the corresponding knife stem.

2. In a sickle, the combination with a bar having a longitudinal passage therethrough and a plurality of transverse slots in its upper face with resultant spaced blocks, the front and side walls of which are slantingly undercut with resultant bevels, of a plurality of knives each having a transversely reduced stem projecting from its base and slidably fitted between a corresponding pair of blocks and into the side bevels of the latter and having its base at both sides of the stem beveled and fitted to the bevels of the front faces of the blocks, the stem of each knife having a diagonal groove in its under face and a rod slidably mounted in the passage of the bar and having lugs movable with the bar into and out of the grooves of the knife stems, each lug having a rear face diagonally disposed to engage the rear face of the groove of the corresponding knife stem, the bar extending forwardly beyond the front faces of the blocks and supporting the bases of the knives forwardly of their bevels.

3. In a sickle, the combination with a bar having a longitudinal passage therethrough and a plurality of transverse slots in its upper face with resultant spaced blocks, the front and side walls of which are slantingly undercut with resultant bevels, of a plurality of knives each having a transversely reduced stem projecting from its base and slidably fitted between a corresponding pair of blocks and into the side bevels of the latter and having its base at both sides of the stem beveled and fitted to the bevels of the front faces of the blocks, the stem of each knife having a diagonal groove in its under face and a rod slidably mounted in the passage of the bar and having lugs movable with the bar into and out of the grooves of the knife stem, each lug having a rear face diagonally disposed to engage the rear face of the groove of the corresponding knife stem, the bar extending forwardly beyond the front faces of the blocks and supporting the bases of the knives forwardly of their bevels, and the blocks and knife stems being flush with each other and overhanging the rear face of the bar body.

In testimony whereof, I affix my signature.

CHARLES F. HOVER.

Copies of this patent may be obtained for five cents each, by addressing the "Commissioner of Patents, Washington, D. C."